2,853,455
Patented Sept. 23, 1958

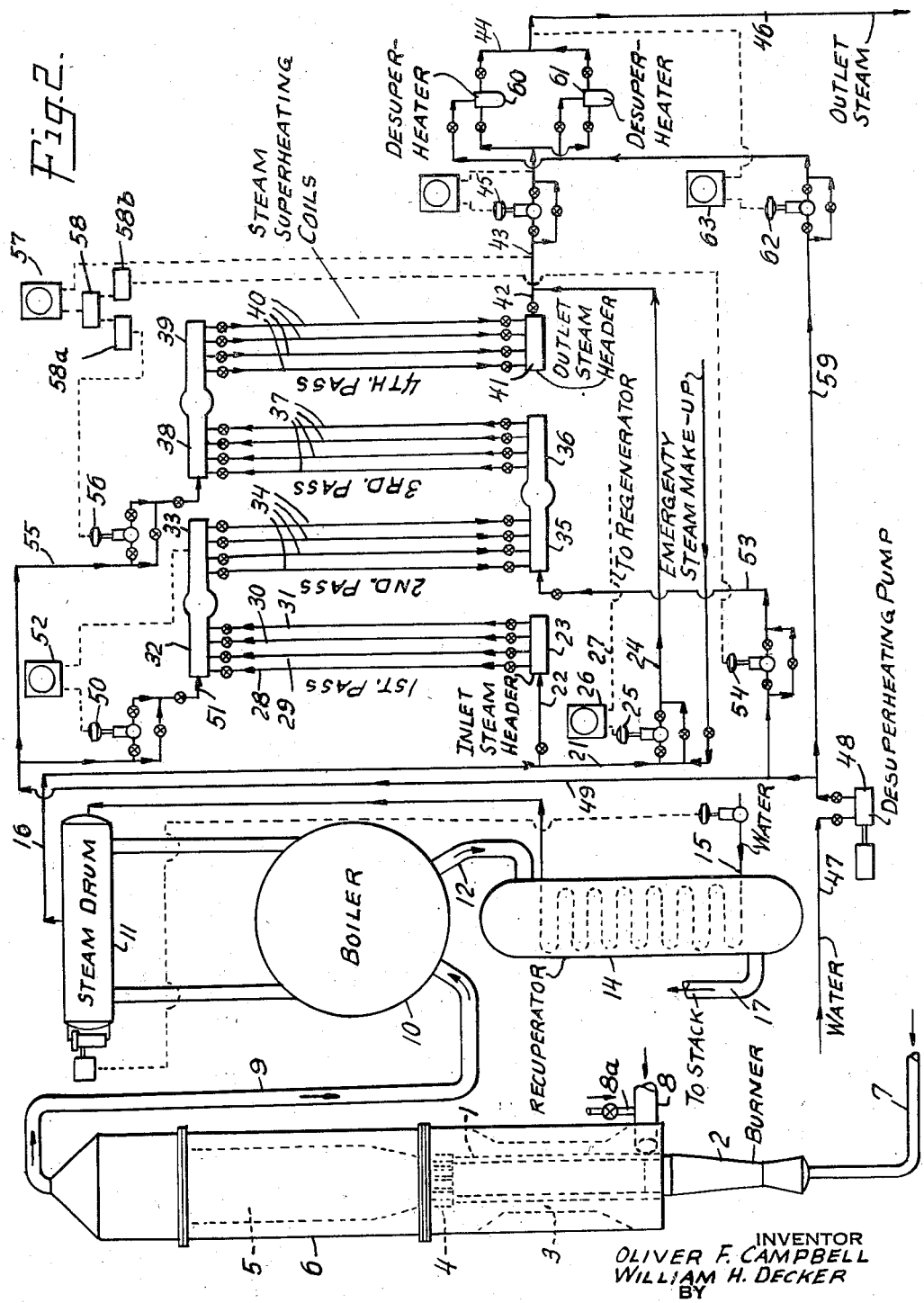

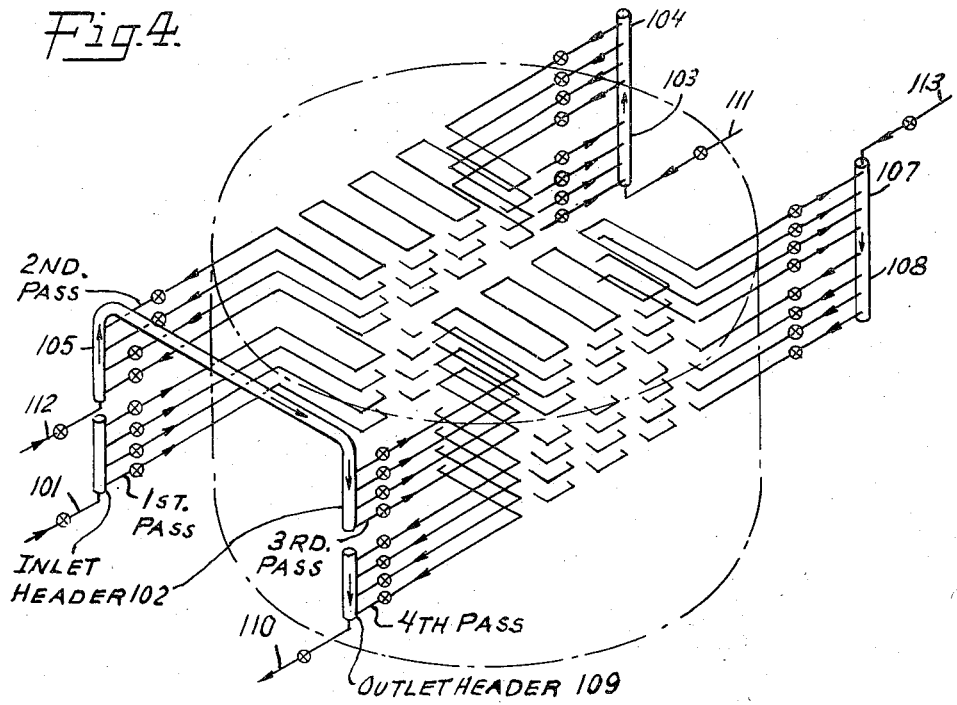
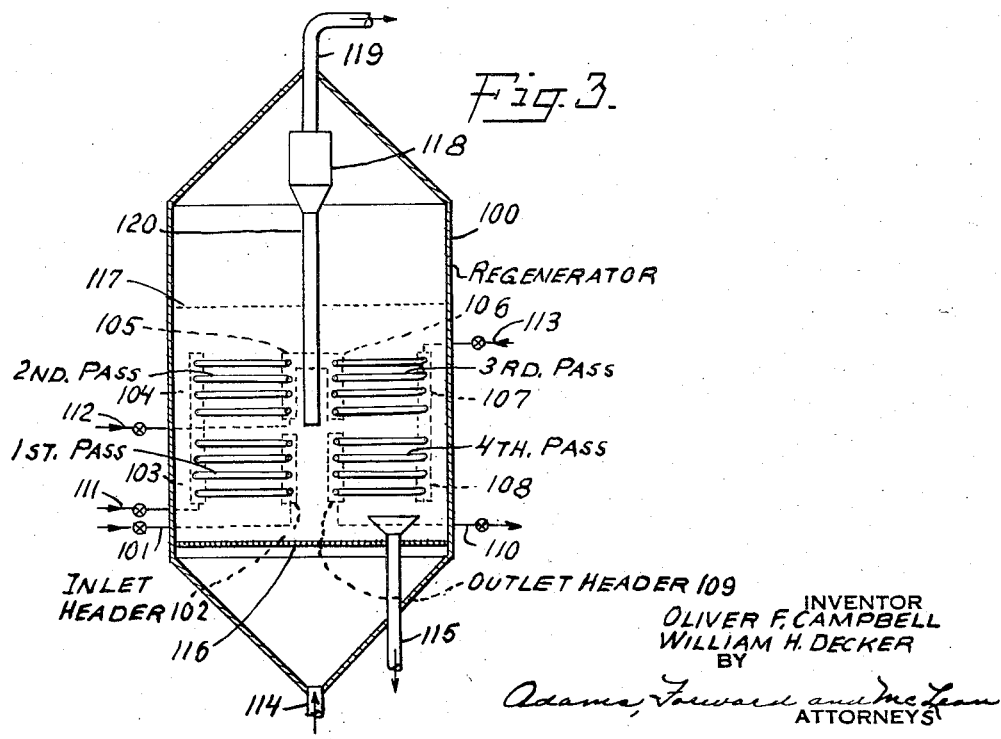

2,853,455

METHOD OF TEMPERATURE CONTROL IN FLUID CATALYST REGENERATOR UNITS

Oliver F. Campbell and William H. Decker, Whiting, Ind., assignors to Sinclair Refining Company, New York, N. Y., a corporation of Maine Application September 9, 1952, Serial No. 308,670

6 Claims. (Cl. 252—417)

This invention relates to improvements in the design and operation of the catalyst regenerator of a fluid catalyst conversion process. More particularly, it relates to a combination system for removing heat from the bed of solid catalyst particles undergoing regeneration by combustion of carbonaceous deposits from the catalyst surface with an oxygen-containing gas in the regenerator of a fluid catalyst cracking unit and for recovering heat from the waste combustion gases discharged from the regenerator.

On most fluid catalyst cracking units, it is necessary to remove heat continuously at a controllable rate from the regenerator where spent catalyst is regenerated by burning off carbonaceous material with air in order to maintain equilibrium cracking conditions since the exothermic heat of regeneration largely imparted to the catalyst, is transmitted to the fresh oil feed to the cracking reactor. It is also necessary to remove heat continuously to prevent undue regeneration temperature levels tending to sinter or deactivate the catalyst permanently by area loss. Conventionally, the necessary heat removal has been accomplished by withdrawing a portion of the catalyst from the bed of catalyst in the regenerator undergoing regeneration and circulating it through a tubular waste heat boiler so as to cool it before return to the catalyst bed. Although this system has performed satisfactorily in commercial units, it is expensive from the operational and maintenance standpoint due to erosive action of the catalyst circulating in the transfer lines, the necessity of automatic slide valve control to control circulation rate and the requirements of compressed air necessary to maintain circulation. In addition, the system requires considerable vertical height to provide sufficient head for positive circulation through the waste heat boiler and into the carrier air line for return to the regenerator. The size, strength and expense of the supporting structure therefore is substantially increased which adds materially to the total construction costs.

The installation of water coils in the regenerator for steam generation has been proposed as a means of heat recovery and temperature control but such a system suffers from several distinct disadvantages. Since each water coil must be either 100% in service or out of service, it is impossible to adjust the rate of heat removal to the inevitable variations in regenerator temperature level by throttling one or more of the coils in order to modulate the control of heat removal and hence provide flexible control over regenerator bed temperature. Thus it is necessary either to place additional coils in operation or take coils out of operation to adjust the rate of heat removal. Only stepwise control of regenerator heat therefore is possible. The result is unsatisfactory performance from the operating standpoint and an extra burden of cost due to the special operator attention required. Moreover, the rapid temperature changes occurring in the tube walls when coils are placed in service to adjust temperature level and heat removal rate shortens the operating life of the coil and results in excessive coil maintenance costs by reason of the rapid quenching of the metal as the water phase flows into and throughout the length of the coil.

In the combination system of our invention, we utilize steam as the medium of heat control by passing the steam through a tubular coil, advantageously a coil of serially arranged tubes providing multipass flow, located within the catalyst bed undergoing regeneration. We have found that substantial savings in terms of waste heat recovery can be simultaneously effected by utilizing the potential heat content of the residual carbon monoxide of the flue gases or waste combustion gases produced in the regeneration process in a combustion operation combined with a heat transfer operation to generate saturated steam for use as the medium for removing heat from the catalyst bed. Regeneration operations are ordinarily conducted at about 1050° to 1250° F. and the flue gases are usually passed through a waste heat boiler to recover heat in the form of steam before being vented to the atmosphere. In order to control temperature in the regeneration zone and in order to provide maximum coke burning capacity for the cubic feet of air or other regeneration gas available, complete combustion of coke to carbon dioxide is avoided and as low a ratio of carbon dioxide to carbon monoxide as is practical is obtained while insuring adequate stripping of coke from the catalyst.

We have found that it is technically feasible and economically highly advantageous to recover the potential heat in the residual carbon monoxide even though it is present in concentrations amounting only to about 5 to 15 B. t. u.'s per cubic foot in terms of thermal values. At the same time, the potential health hazard represented by the presence of the carbon monoxide in the otherwise inert flue gas mixtures when discharged to the atmosphere in populated areas is eliminated.

We have found that it is necessary, because of the very low concentrations of the carbon monoxide in the otherwise inert flue gas mixtures, to provide for combustion of the carbon monoxide at high temperature, e. g. upwards of about 1400° F., unless a special catalytic combustion system is used. It is usually necessary then to deliver the flue gases discharged from the regenerator to a furnace where the flue gas stream can be turbulently mixed with combustion air or oxygen and additional fuel to provide the temperature level necessary for the carbon monoxide combustion reaction to occur spontaneously. Boiler tubes may be provided in the furnace or the superheated flue gas stream may be conducted to a separate boiler for generation of steam from water by indirect heat exchange.

In accordance with our invention, then, steam, generated by heat recovered from the waste combustion gases from the regenerator utilizing residual carbon monoxide content, is passed through a tubular coil located within the catalyst bed in the regenerator wherein it functions to remove heat at a rate proportional to its inlet temperature and mass flow rate whereby the temperature of the regenerator bed can be controlled with accuracy and flexibility. In practice it is specially valuable to provide automatic temperature control by by-passing a portion of the steam flow to the regenerator superheating coil in a controlled amount continuously around the coil to its outlet. The rate of heat removal then is automatically controlled by regulating the amount of by-pass steam in response to temperature change within the bed. Thus if the bed temperature drops, the steam flow through the superheater coil is reduced and the amount of by-pass steam is increased in order to maintain the regenerator bed temperature at a constant operating level.

Additional flexibility may be introduced into the system together with increased efficiency of heat removal by providing for injection of a cooling spray in a controlled amount at a point intermediate the superheater coil inlet and outlet. Thus in a multi-pass coil system, the steam at the outlet from one pass may be reduced to any desired temperature level in response to changes in the inlet temperature of a subsequent pass, insuring flexibility and efficiency of heat removal, and providing modulating regenerator temperature control. Similar respray desuperheating may be provided in the steam outlet line in order to maintain a constant outlet steam temperature suitable for smooth turbine operation in utilization of the net steam make.

Our invention will be further understood by consideration of the accompanying drawings.

Figure 1 of the accompanying drawings represents a simplified diagrammatic flow plan of the combined steam generating and superheating system for simultaneous removal of heat from the regenerator bed and recovery of heat from the flue gases of a fluid gas heat regenerator.

Figure 2 illustrates in combination, a carbon monoxide boiler of the type described in our copending application Serial No. 235,183, filed July 5, 1951, now Patent No. 2,753,925, for generating saturated steam, together with its auxiliary equipment and a generalized flow plan of the steam flow from the carbon monoxide boiler through the bypass control system and regenerator superheating coils, illustrating diagrammatically the essential control equipment.

Figure 3 represents diagrammatically a vertical section through a fluid catalyst regenerator vessel containing one superheater coil arrangement suitable for application of our invention.

Figure 4 illustrates in the form of an isometric section through the regenerator vessel, the details of coil arrangement.

Figure 1:
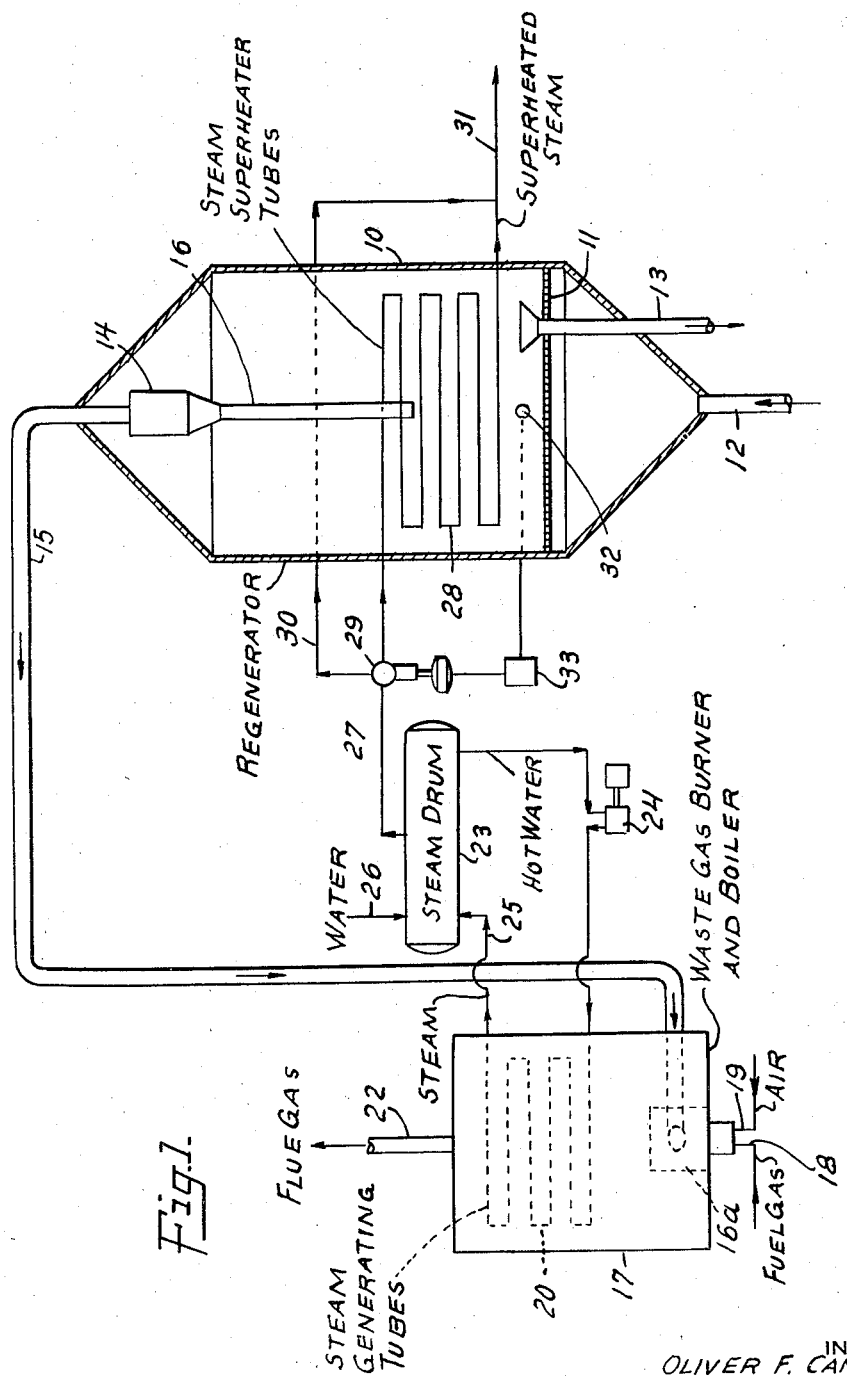

In the operation illustrated in Figure 1, a bed of finely divided catalyst particles to be regenerated by burning off carbonaceous or coke deposits is maintained in a fluidized condition in regenerator 10 above distribution grid 11. Spent catalyst enters the regenerator 10 through spent catalyst riser 12. Regenerated catalyst is withdrawn from the regenerator 10 through standpipe 13 for recirculation to the reactor (not shown). Combustion air for the regeneration process usually is introduced to the regenerator as the carrier medium for transferring catalyst from riser 12 into the bed. Flue gases produced by the regeneration process leave regenerator 10 through cyclone system 14 and overhead line 15. Dip leg 16 is provided in connection with cyclone system 14 for returning catalyst fines disengaged thereby to the regenerator bed.

The hot flue gases in line 15 are delivered to the combustion zone 16a of the furnace indicated diagrammatically at 17. Essentially utilization of the flue gas carbon monoxide requires a furnace or burner system that intimately mixes the flue gas, which is ordinarily at a temperature of about 700° to 1100° F., with air and additional fuel. The use of extraneous fuel may be avoided by employing a catalyst, for example by providing ceramic rods coated with a Pt-metallic compound complex catalyst composition in the path of furnace flow.

As indicated tangential entry to combustion zone 16a is advantageous so that the entering flue gases are turbulently and intimately mixed with fuel gas and air supplied respectively by connections 18 and 19. Multiple entry ports in alternating arrangement may be advantageously employed. The resulting combustion mixture superheated by the carbon monoxide combustion reaction passes over steam generating tubes 20 and exits from the furnace 17 through connection 22 to the stack or to an economizer section (not shown).

Water is circulated through tubes 20 from steam drum 23, by means of pump 24. Steam return line 25 is provided to steam drum 23. Make-up water may be introduced by connection 26. Saturated steam from steam drum 23 is passed through line 27 to steam superheater tubes 28. A portion of the steam passing through line 27 is by-passed continuously under control of by-pass valve system 29 through line 30 around superheater tubes 28 to the superheated steam outlet line 31. The amount of by-pass steam is regulated by by-pass valve means 29 in response to temperature change measured by thermometric means 32 located in the catalyst bed and temperature recording means 33.

In the system of Figure 2, a carbon monoxide boiler and furnace design of the type described in our beforementioned application Serial No. 235,183 is employed.

The carbon monoxide burner apparatus illustrated in Figure 2 comprises essentially a muffle tube 1, a conventional gas burner 2, an annular chamber 3, a mixing register 4, and a furnace chamber 5 all situated within a steel pipe 6. The muffle tube may consist of a cylindrical tube 6 inches in the inside diameter, constructed of Carborundum refractory. The extraneous fuel burner 2 may be any conventional burner susceptible of high rates of heat release and convenient control. By way of example, a 4-inch Maxon Ventite gas burner can be employed in which gas is supplied through line 7 and in which air is aspirated at the venturi so that single valve control is provided. Annular chamber 3 is an annular chamber surrounding the muffle tube, the outside wall of which annular chamber may be lined with plastic refractory to reduce heat losses. The mixing register 4 may be a circular vane wheel provided with small vanes at the periphery. The furnace chamber 5 located above the mixing register may be lined with plastic refractory to reduce heat losses. The steel pipe 6 may be for example, a 20-inch diameter steel pipe. Muffle tube 1 serves as a combustion chamber for this extraneous fuel.

The carbon monoxide containing flue gases are introduced tangentially at the bottom of annular zone or plenum chamber 3 by means of line 8. Excess air may be supplied by means of line 8A. The purpose of the plenum chamber 3 is to provide preheat to the incoming flue gases and the introduction of the flue gases is tangential so as to impart the maximum rotary motion to these gases to increase their residence time in the annular chamber. The preheated flue gases then pass through mixing register 4. The small vanes at the periphery of the mixing register are set at such an angle as to impart a high velocity circular motion to the flue gases leaving the annular chamber and passing into the high temperature combustion gases leaving the muffle tube. The thoroughly admixed flue gases then pass into furnace zone 5 where the carbon monoxide ignites spontaneously and is completely burned. In operating our heat recovery system illustrated in Figure 2 the total carbon monoxide free flue gases leave combustion chamber 5 and are passed through conduit 9 to the tubes of waste heat boiler 10. The waste heat boiler may be designed in the usual manner with suitable capacity to recover any desired amount of heat from the combustion gases. An exit temperature of the order of about 700° F., for example, may be satisfactory. If a water tube waste heat unit is employed, advantageously the tubes should be provided with fittings or gill rings to increase heat transfer efficiency and thereby reduce the number of the tubes required. Boiler feed water may be supplied from overhead drum 11. The cooled gas stream may be then passed through conduit 12 to a second heat recovery unit 14. Advantageously heat recovery unit 14 serves as a boiler feed water economizer through which treated boiler feed water supplied through line 15 is passed before admission to boiler feed drum 11. High temperature steam is withdrawn from the feed heat boiler through line 16. The cooled carbon monoxide free combustion gases are vented to the atmosphere through line 17.

Steam from steam drum 11 is passed by means of line 16 in divided flow through valved connection 22 leading to inlet steam header 23 and through connection 24 from line 21 under control of automatic valve control system 25. The bypass valve assembly includes the valve structure and temperature controller 26 connected as indicated by 27 to thermometric means located in the regenerator bed. From inlet steam header 23 the steam flows in parallel through tubes 28 and 29, 30 and 31 to the first pass outlet header 32. The steam then passes from second pass inlet header 33 through tubes 34 to the second pass outlet header 35, thence through third pass inlet header 36 and tubes 37 to third pass outlet header 38 and from thence through fourth pass inlet header 39 and tubes 40 to final outlet header 41. Bypass steam from line 24 is joined with the discharge superheated steam in the outlet steam line 42 from outlet header 41. The blend is passed by means of connection 43 through desuperheater system 44 under control of temperature controller valve system 45 and is made available for consumption by means of line 46.

In each pass through the superheating coils, the steam from the previous pass is reduced to a temperature approximating the temperature (for the pressure involved) at the inlet to a preceding pass by desuperheating sprays located in the outlet headers. Thus as shown in the drawing, water, advantageously condensate water, is pumped from line 47 by pump 48 through line 49 to automatic control valve system 50 which controls the rate at which it is sprayed into outlet header 32 by means of connection 51. The water respray rate to outlet header 32 is under automatic temperature control through controller 52 responsive to the steam temperature into second pass inlet header 33. Spray water flows to second pass outlet header 35 through line 53 and automatic control valve 54. Spray water to the third pass outlet header 38 flows through line 55 and automatic control valve system 56. The respray rate to the second pass and third pass outlet headers is controlled by valves 54 and 56 actuated by automatic temperature controller 57 in response to the final outlet steam temperature in line 43. Advantageously, controller 57 operates through a differential relay and selector valve system indicated by elements 58, 58a and 58b in association with control valves 54 and 56 so that the respray rate to each header can be easily adjusted to provide for any desired split between the second and third pass outlets. The final outlet temperature is regulated, advantageously for steam turbine use as 750° F., for example, by spray water injected by means of line 59 into parallel flow desuperheater pots 60 and 61 of desuperheater system 44. The rate of respray is controlled from line 59 by means of automatic control valve 62 and controller 63 responsive to the steam temperature measured in line 46.

In Figures 3 and 4, one arrangement of coils within regenerator 100 is shown. The flow is serial from valved connection 101 to inlet header 102 to first pass outlet header 103, thence from second pass inlet header 104, to second pass outlet header 105, from third pass inlet header 106 to third pass outlet header 107, and from fourth pass inlet header 108 to the final outlet header 109. The superheated steam is discharged by valved connection 110. Respray water for desuperheating is introduced to each of the outlet headers by means of valved connections 111, 112 and 113 respectively. In regenerator 100 the catalyst entry is indicated as through catalyst riser 114 with withdrawal through catalyst standpipe 115. The bed of finely divided solid catalyst is maintained in fluidized condition by flow of air and flue gases upwardly through the bed over distribution grid 116. The catalyst bed level is indicated at 117. Flue gases disengaging in the free space in the upper portion of regenerator 100 exit through the cyclone system indicated at 118 by means of overhead line 119. Dip leg 120 is provided to return catalyst particles recovered by cyclone system 118 to the catalyst bed.

In an example of operation for a regenerator heat absorption of 100,000,000 B. t. u./hour the carbon monoxide boiler make is 205,000 lbs./hour of steam 502° W. with a drum pressure of 685 p. s. i. g. With a flow to the superheater of 153,750 lbs./hour of steam and a bypass flow of 51,250 lbs./hour, the distribution of the cooling spray water, total 49,400 lbs./hour, is 13,920 to the first pass outlet, 15,080 to the second pass outlet and 20,400 to the third pass outlet, maintaining the following coil conditions at a regenerator operating temperature of 1100° F. and with an average heat transfer rate of 65 B. t. u./hr./sq.ft./°F.:

|  | Temperature, °F. | Pressure, P. s. i. g. |
|---|---|---|
| 1st Pass Inlet | 502 | 675 |
| 1st Pass Outlet | 900 | 650 |
| 2nd Pass Inlet | 700 |  |
| 2nd Pass Outlet | 900 | 625 |
| 3rd Pass Inlet | 700 |  |
| 3rd Pass Outlet | 900 | 600 |
| 4th Pass Inlet | 658 |  |
| 4th Pass Outlet | 831 | 575 |
| Final Steam Outlet | 750 | 575 |

We claim:

1. A method for removing heat from a body of fluidized solid catalyst particles undergoing regeneration in a regenerator of a fluid catalyst conversion unit wherein excess heat is liberated by incomplete combustion of carbonaceous deposits from the catalyst surface with an oxygen-containing gas and for recovering waste heat from the regenerator waste combustion gases which comprises delivering waste combustion gases from the regenerator to a furnace, burning the carbon monoxide in the waste combustion gases at elevated temperature, generating steam by indirect heat exchange between the resulting combustion gases and water, and passing the steam so generated through a tubular coil located in the bed of fluidized catalyst particles undergoing regeneration in the regenerator.

2. A method for removing heat from a body of fluidized solid catalyst particles undergoing regeneration in a regenerator of a fluid catalyst conversion unit wherein excess heat is liberated by incomplete combustion of carbonaceous deposits from the catalyst surface with an oxygen-containing gas and for recovering waste heat from the regenerator waste combustion gases which comprises delivering waste combustion gases from the regenerator to a furnace, burning the carbon monoxide in the waste combustion gases at elevated temperature, generating saturated steam by indirect heat exchange between the resulting combustion gases and water, passing the steam so generated through a tubular coil located in the bed of fluidized catalyst particles undergoing regeneration in the regenerator, and by-passing a portion of the saturated steam around the coil in an amount fixed by the temperature prevailing within the regenerator catalyst bed and varying as an inverse function thereof whereby the rate of heat removal from the catalyst bed is controlled by the amount of by-pass steam.

3. A method for removing heat from a body of fluidized solid catalyst particles undergoing regeneration in a regenerator of a fluid catalyst conversion unit wherein excess heat is liberated by incomplete combustion of carbonaceous deposits from the catalyst surface with an oxygen-containing gas and for recovering waste heat from the regenerator waste combustion gases which comprises delivering waste combustion gases from the regenerator to a furnace, burning the carbon monoxide in the waste combustion gases at elevated temperature, generating saturated steam by indirect heat exchange between the resulting combustion gases and water, passing the steam so generated through a tubular coil located in the bed of fluidized catalyst particles undergoing regeneration in the regenerator, by-passing a portion of the saturated steam around the coil in an amount fixed by the temperature prevailing within the regenerator catalyst bed and varying as an inverse function thereof whereby the rate of heat removal from the catalyst bed is controlled by the amount of by-pass steam and controlling the temperature of the superheated steam discharged from the coil by injecting a cooling spray into direct contact with steam discharging from the coil in an amount controlled by the final discharge steam temperature.

4. A method for removing heat from a body of fluidized solid catalyst particles undergoing regeneration in a regenerator of a fluid catalyst conversion unit wherein excess heat is liberated by incomplete combustion of carbonaceous deposits from the catalyst surface with an oxygen-containing gas and for recovering waste heat from the regenerator waste combustion gases which comprises delivering waste combustion gases from the regenerator to a furnace, burning the carbon monoxide in the waste combustion gases at elevated temperature, generating saturated steam by indirect heat exchange between the resulting combustion gases and water, passing the steam so generated through a coil of serially connected tubes located in the bed of fluidized catalyst particles undergoing regeneration in the regenerator, by-passing a portion of the saturated steam around the coil in an amount fixed by the temperature prevailing within the regenerator catalyst bed and varying as an inverse function thereof while simultaneously injecting a cooling spray at an intermediate point in the coil whereby the rate of heat removal from the catalyst bed is controlled by the amount of by-pass steam and the rate of spray injection.

5. A method for removing heat from a body of fluidized solid catalyst particles undergoing regeneration in a regenerator of a fluid catalyst conversion unit wherein excess heat is liberated by incomplete combustion of carbonaceous deposits from the catalyst surface with an oxygen-containing gas and for recovering waste heat from the regenerator waste combustion gases which comprises delivering waste combustion gases from the regenerator to a furnace, burning the carbon monoxide in the waste combustion gases at elevated temperature, generating saturated steam by indirect heat exchange between the resulting combustion gases and water, passing the steam so generated through a coil of serially connected tubes located in the bed of fluidized catalyst particles undergoing regeneration in the regenerator, by-passing a portion of the saturated steam around the coil in an amount fixed by the temperature prevailing within the regenerator catalyst bed and varying as an inverse function thereof while simultaneously injecting a cooling spray at an intermediate point in the coil whereby the rate of heat removal from the catalyst bed is controlled by the amount of by-pass steam and the rate of spray injection and controlling the temperature of the superheated steam discharged from the coil by injecting a cooling spray into direct contact with steam discharging from the coil in an amount controlled by the final discharge steam temperature.

6. A method for removing heat from a body of fluidized solid catalyst particles undergoing regeneration in a regenerator of a fluid catalyst conversion unit wherein excess heat is liberated by incomplete combustion of carbonaceous deposits from the catalyst surface with an oxygen-containing gas and for recovering waste heat from the regenerator waste combustion gases which comprises delivering waste combustion gases from the regenerator to a furnace, burning the carbon monoxide in the waste combustion gases and an added fuel at elevated temperature, generating steam by indirect heat exchange between the resulting combustion gases and water, and passing the steam so generated through a tubular coil located in the bed of fluidized catalyst particles undergoing regeneration in the regenerator.

References Cited in the file of this patent

UNITED STATES PATENTS

| | | |
|---|---|---|
| 2,223,162 | Benedict | Nov. 26, 1940 |
| 2,371,381 | Campbell et al. | Mar. 13, 1945 |
| 2,391,327 | Mekler | Dec. 18, 1945 |
| 2,396,157 | Claussen | Mar. 5, 1946 |
| 2,431,630 | Arveson | Nov. 25, 1947 |